(12) United States Patent
Senn et al.

(10) Patent No.: US 11,073,048 B2
(45) Date of Patent: Jul. 27, 2021

(54) DIFFUSER OF AN EXHAUST GAS TURBINE

(71) Applicant: ABB Schweiz AG, Baden (CH)

(72) Inventors: Stephan Senn, Remigen (CH); Christoph Mathey, Fislisbach (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/647,393

(22) PCT Filed: Sep. 5, 2018

(86) PCT No.: PCT/EP2018/073871
§ 371 (c)(1),
(2) Date: Mar. 13, 2020

(87) PCT Pub. No.: WO2019/052874
PCT Pub. Date: Mar. 21, 2019

(65) Prior Publication Data
US 2020/0217225 A1    Jul. 9, 2020

(30) Foreign Application Priority Data
Sep. 14, 2017  (DE) .......................... 102017121337.6

(51) Int. Cl.
*F01D 25/30*    (2006.01)
(52) U.S. Cl.
CPC .................... *F01D 25/30* (2013.01)
(58) Field of Classification Search
CPC ................ F01D 25/30; F05D 2220/40; F05D 2250/232; F05D 2250/70
(Continued)

(56) References Cited

U.S. PATENT DOCUMENTS 2,390,506 A    12/1945  Buchi
2,916,198 A  * 12/1959  Weisel ................... F02C 6/12
                                                    417/351
(Continued)

FOREIGN PATENT DOCUMENTS

AT    168357 B    11/1950
DE    762097 A    5/1954
(Continued)

OTHER PUBLICATIONS

International Search Report and Written Opinion for PCT/EP2018/073871, dated Nov. 23, 2018, 20 pages (including translation).
(Continued)

*Primary Examiner* — Hoang M Nguyen
(74) *Attorney, Agent, or Firm* — Barnes & Thornburg LLP

(57) ABSTRACT

The invention relates to an exhaust gas turbine, comprising a turbine wheel (7) with a multiplicity of moving blades (8) and an exhaust-gas outlet duct (15), which is arranged downstream of the moving blades of the turbine wheel. The exhaust-gas outlet duct (15) is delimited radially on the outside by an axial turbine diffuser (1) and radially on the inside, at least partially, by a spinner (2). The axial turbine diffuser (1) is formed by a number N>1 of successive conical diffuser segments. An axial diffuser opening angle A between successive diffuser segments is A>1.0°. A ratio L/H between an axial diffuser segment length L and an entry height H of the exhaust-gas outlet duct (15) is L/H>0.01. A ratio H/S between the entry height H of the exhaust-gas outlet duct and a maximum radius S of the spinner (2) is H/S>1.0. The spinner (2) is formed by a number P>1 of successive conical spinner segments. An axial spinner opening angle B between successive spinner segments is B>1.0°. A ratio M/H between an axial spinner segment length M and (Continued)

the entry height H of the exhaust-gas outlet duct (15) is M/H>0.01.

20 Claims, 4 Drawing Sheets

(58) Field of Classification Search
USPC .................................... 415/219.1, 220, 221
See application file for complete search history.

(56) References Cited

U.S. PATENT DOCUMENTS

| | | | | |
|---|---|---|---|---|
| 3,904,312 A | * | 9/1975 | Exley | ...................... F04D 29/44 415/181 |
| 2002/0127100 A1 | * | 9/2002 | Kreitmeier | .............. F01D 25/30 415/211.2 |
| 2010/0303607 A1 | * | 12/2010 | Orosa | ..................... F01D 25/30 415/1 |
| 2011/0002780 A1 | * | 1/2011 | Higashimori | ......... F04D 29/284 415/203 |

FOREIGN PATENT DOCUMENTS

| | | |
|---|---|---|
| DE | 1061132 A | 7/1959 |
| DE | 1228857 A | 11/1966 |
| DE | 10310678 B3 | 9/2004 |
| EP | 1178183 A2 | 7/2001 |
| WO | 2013/037437 A2 | 2/2013 |

OTHER PUBLICATIONS

Search Report for DE 102017121337.6, dated Jul. 9, 2018, 12 pages (including translation).

* cited by examiner

12

DIFFUSER OF AN EXHAUST GAS TURBINE

CROSS-REFERENCE TO RELATED APPLICATIONS

This application is a national stage entry under 35 U.S.C. § 371 of PCT International Application No. PCT/EP2018/073871, filed Sep. 5, 2018, which claims priority to German Patent Application No. 10 2017 121 337.6, filed Sep. 14, 2017. The entire disclosures of the foregoing applications are incorporated herein by reference.

TECHNICAL FIELD

The invention relates to the field of exhaust gas turbochargers for pressure-charged internal combustion engines. In particular, the invention relates to an axial diffuser of an exhaust gas turbine of an exhaust gas turbocharger.

TECHNICAL BACKGROUND

To boost the power of an internal combustion engine, the use of exhaust gas turbochargers with a turbine in the exhaust tract of the internal combustion engine and with a compressor positioned ahead of the internal combustion engine is standard practice nowadays. In this case, the exhaust gases from the internal combustion engine are expanded in the turbine. The work obtained in this process is transferred by means of a shaft to the compressor, which compresses the air fed to the internal combustion engine. Through the use of the energy of the exhaust gases to compress the air fed to the combustion process in the internal combustion engine, the combustion process and the efficiency of the internal combustion engine can be optimized.

In the case of exhaust gas turbines, known from the prior art, of exhaust gas turbochargers, pressure recovery at the exhaust gas turbine outlet is typically achieved by means of diffusers, which can be formed in a ring shape and, rectilinearly, in a conical manner, for example. To improve pressure recovery, a nonrotating, conical construction element is furthermore typically mounted on the hub of the turbine wheel.

It has been found that pressure recovery still requires improvement in the case of such exhaust gas turbine diffusers known from the prior art. It has furthermore been found that the conventional diffusers have certain disadvantages in respect of complexity, size of installation space and costs.

BRIEF DESCRIPTION OF THE INVENTION

It is the object of the present invention to make available an exhaust gas turbine having a diffuser which is improved over the exhaust gas diffusers known from the prior art. In particular, it is the object of the present invention to make available an exhaust gas turbine having a diffuser which is less complex and has improved pressure recovery.

To achieve the abovementioned object, an exhaust gas turbine as claimed in independent claim 1 is made available. Further aspects, advantages and features of the present invention can be found in the dependent patent claims, the description and the appended figures.

According to one aspect of the invention, an exhaust gas turbine is made available. The exhaust gas turbine comprises a turbine wheel having a multiplicity of moving blades and an exhaust-gas outlet duct. The exhaust-gas outlet duct is arranged downstream of the moving blades of the turbine wheel. The exhaust-gas outlet duct is delimited radially on the outside by an axial turbine diffuser and radially on the inside, at least partially, by a spinner. The axial turbine diffuser is formed by a number N>1 of successive conical diffuser segments. An axial diffuser opening angle A between successive diffuser segments is A>1.0°. A ratio L/H between an axial diffuser segment length L and an entry height H of the exhaust-gas outlet duct is L/H>0.01. A ratio H/S between the entry height H of the exhaust-gas outlet duct and a maximum radius S of the spinner is H/S>1.0. The spinner is formed by a number P>1 of successive conical spinner segments. An axial spinner opening angle B between successive spinner segments is B≥1.0°. A ratio M/H between an axial spinner segment length M and the entry height H of the exhaust-gas outlet duct is M/H≥0.01.

An exhaust gas turbine having a diffuser which is improved over the exhaust gas turbines known from the prior art is thus advantageously made available. In particular, the exhaust gas turbine according to the invention provides an exhaust gas turbine with an improved diffuser design which allows improved pressure recovery at the exhaust gas turbine outlet. Moreover, a diffuser for an exhaust gas turbine is made available which is less complex and has a smaller size of installation space, thereby ensuring that production costs are advantageously lower.

According to another aspect of the invention, an exhaust gas turbocharger having an exhaust gas turbine according to one of the embodiments described herein is made available, thereby advantageously making it possible to make available an improved exhaust gas turbocharger.

BRIEF DESCRIPTION OF THE FIGURES

The invention will be explained below by means of illustrative embodiments illustrated in figures, from which further advantages and modifications will become apparent. In the drawing.

DETAILED DESCRIPTION OF THE FIGURES

Figure 1:
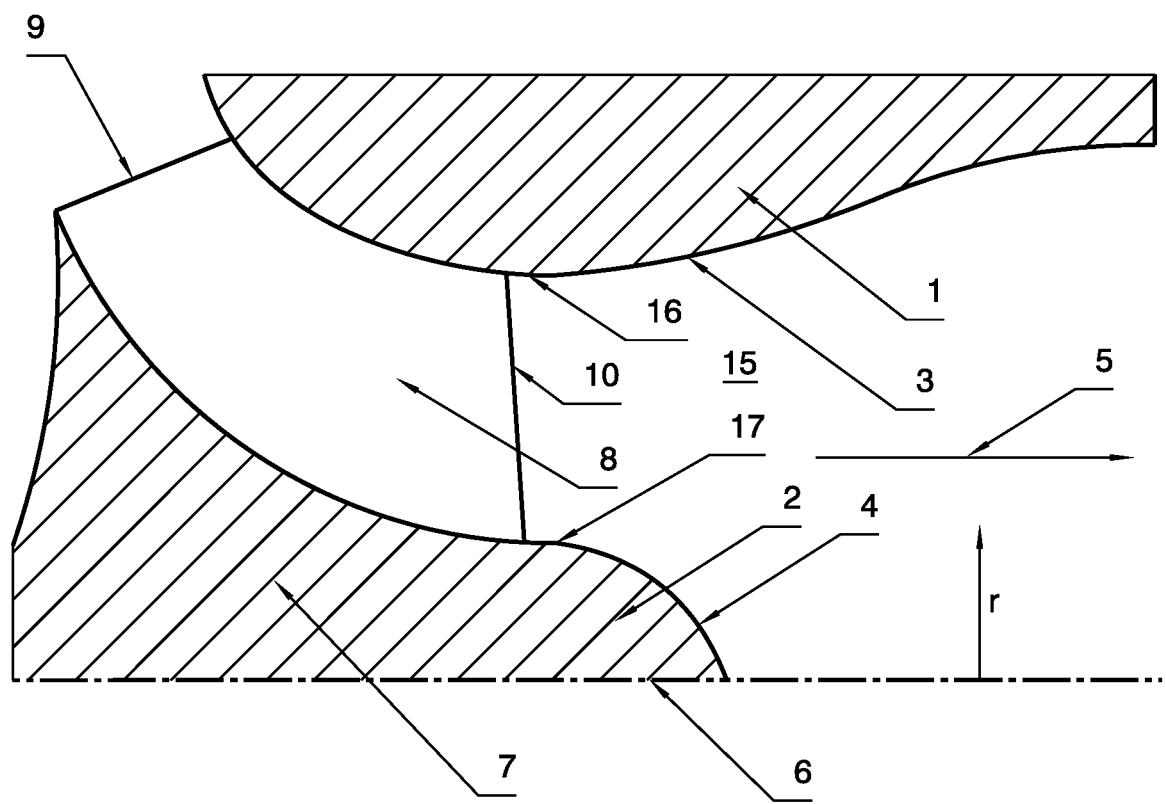
FIG. 1 shows a schematic longitudinal section through a partial region of an exhaust gas turbine according to embodiments described herein.

FIG. 1 shows a schematic longitudinal section through a partial region of an exhaust gas turbine according to embodiments described herein.

In particular, FIG. 1 shows a turbine wheel 7 having an axial axis of rotation 6, around which the turbine wheel is rotatably mounted. The turbine wheel 7 typically has a multiplicity of moving blades 8, wherein just one moving blades 8 is shown, by way of example, in the detail illustrated in FIG. 1. The diffuser concept described herein can be applied to mixed-flow turbines, radial turbines and axial turbines but is not restricted to mixed-flow turbines, radial turbines and axial turbines.

The moving blades 8 of the turbine wheel 7 typically comprise a leading edge 9 and a trailing edge 10. In this context, it should be noted that the leading edge 9 of the moving blades 8 is that edge of the moving blades toward which the exhaust gas flows during the operation of the exhaust gas turbine. The trailing edge 10 of the moving blades 8 is that edge of the moving blades from which the exhaust gas flows out during the operation of the exhaust gas turbine. In FIG. 1, the direction of flow 5 of the exhaust gas is indicated by an arrow.

As is shown by way of example in FIG. 1, the exhaust gas turbine according to the invention comprises an exhaust-gas outlet duct 15, which is arranged downstream of the moving blades 8 of the turbine wheel 7. The exhaust-gas outlet duct 15 is delimited radially on the outside by an axial turbine diffuser 1. Furthermore, the exhaust-gas outlet duct 15 is delimited radially on the inside, at least partially, by a spinner 2. According to one embodiment, which can be combined with other embodiments described herein, the axial turbine diffuser 1 is of static design (nonrotating). Furthermore, the spinner 2 can be of rotatable design.

Figure 2:
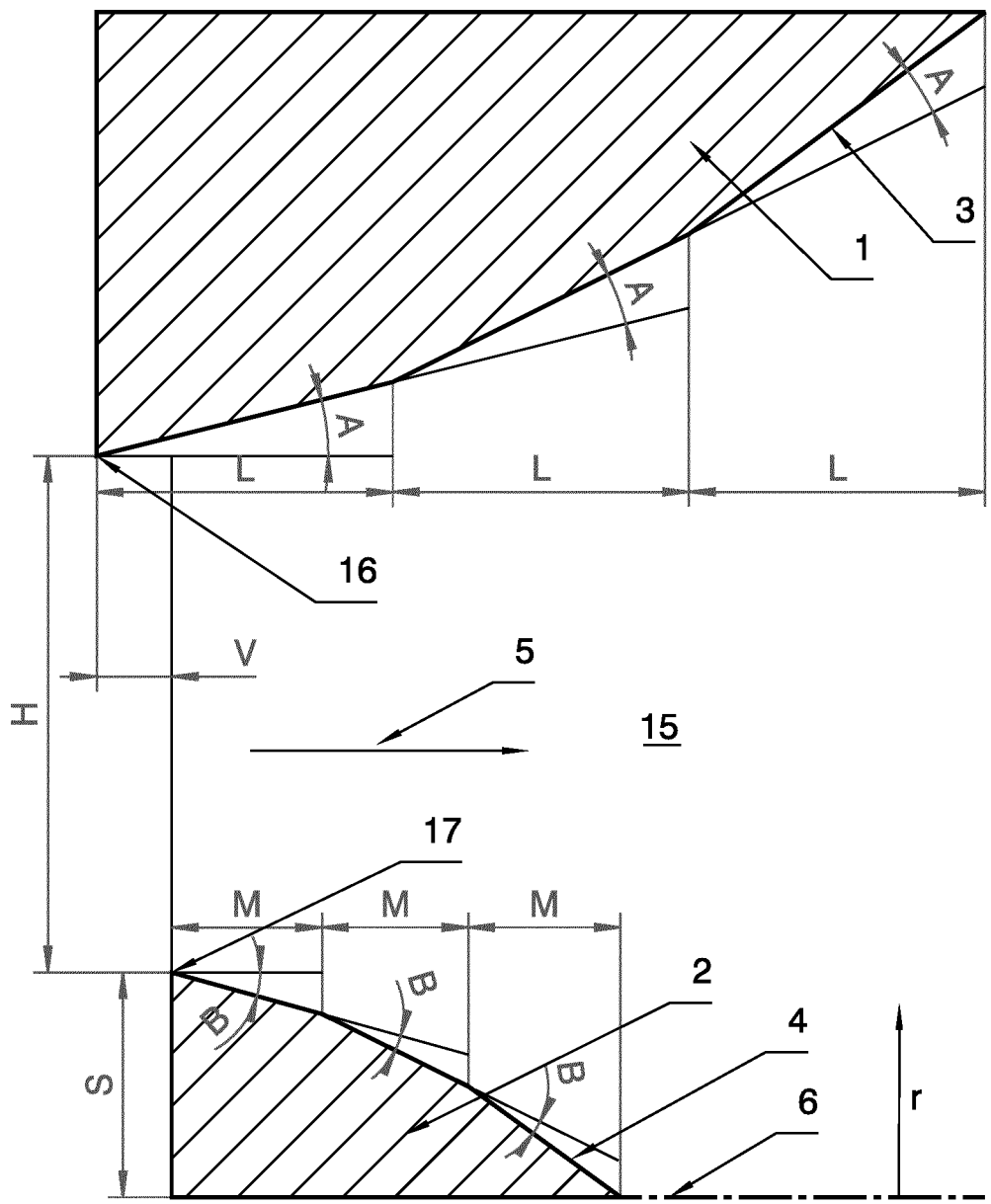
FIG. 2 shows a schematic section through an exhaust-gas outlet duct of an exhaust gas turbine according to embodiments described herein.
Figure 3:
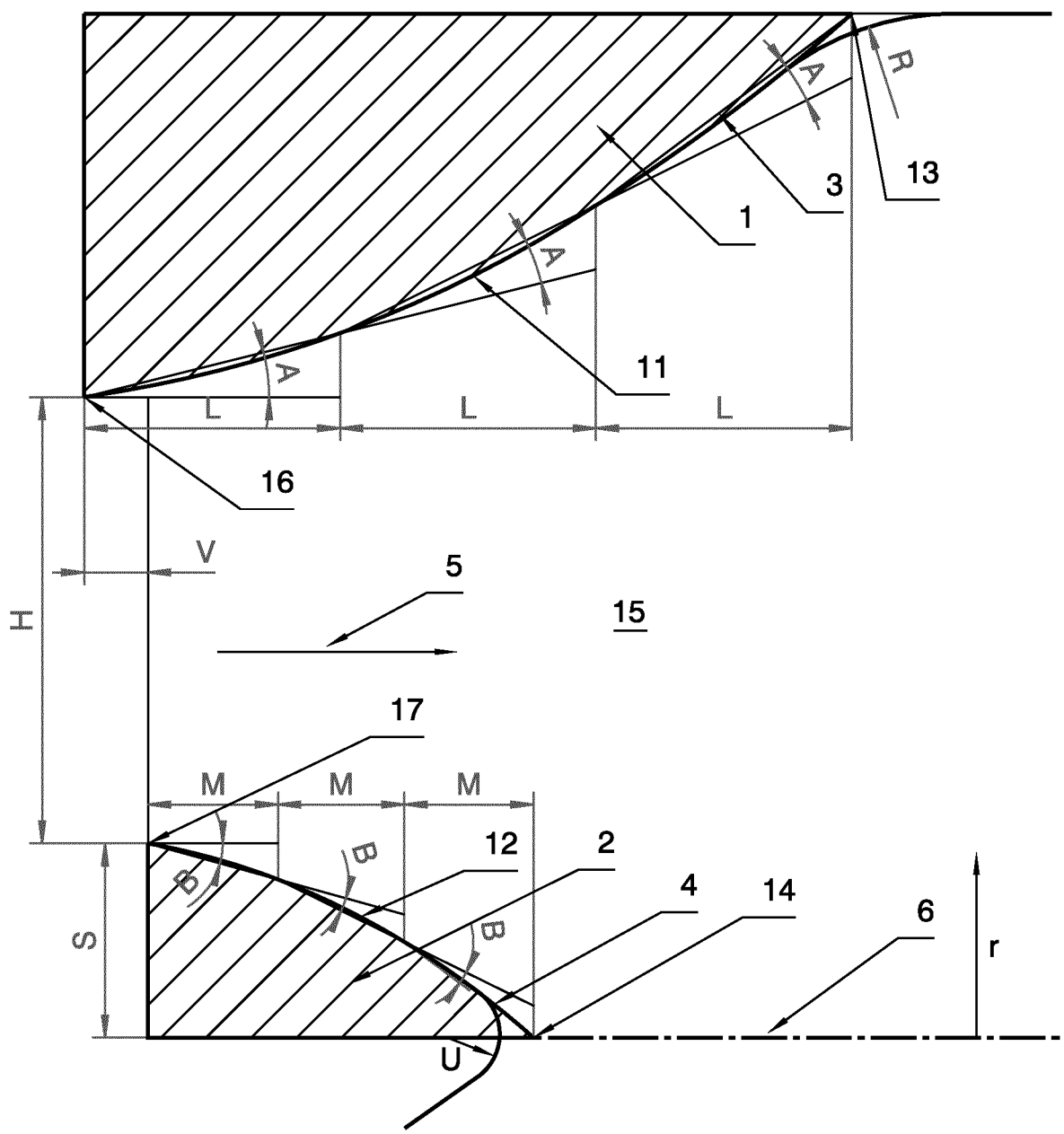
FIG. 3 shows a schematic section through an exhaust-gas outlet duct of an exhaust gas turbine according to further embodiments described herein.

As illustrated by way of example in FIG. 1, the turbine diffuser 1 typically comprises a radially inward-oriented diffuser contour 3. As is apparent from FIG. 1, the radially inward-oriented diffuser contour 3 forms the radially outer boundary of the exhaust-gas outlet duct 15. The spinner typically comprises a radially outward-oriented spinner contour 4. As is apparent from FIG. 1, the radially outward-oriented spinner contour 4 forms the radially inner boundary of the exhaust-gas outlet duct 15. In FIGS. 1-3, the radial direction is illustrated by way of example by the arrow r. "Radially inward-oriented" means oriented toward the axis of rotation 6 or axis of symmetry of the exhaust-gas outlet duct. "Radially outward-oriented" means oriented away from the axis of rotation 6 or axis of symmetry of the exhaust-gas outlet duct.

According to one embodiment, which can be combined with other embodiments described herein, the spinner 2 can be embodied as an integral component part of the turbine wheel 7, as shown by way of example in FIG. 1. In other words, the spinner can be an integral part of the turbine wheel. As an alternative, it is possible, for example, for the spinner 2 to be embodied as a separate component part, which can be connected to the turbine wheel, as illustrated by way of example in FIG. 4. Accordingly, the spinner 2 can corotate with the turbine wheel 7 during the operation of the exhaust gas turbine and thus rotates at the same speed of rotation as the turbine wheel.

In embodiments described herein, in which the spinner is embodied as a separate component part, the spinner 2 is connected centrally to the turbine wheel 7. In other words, the spinner 2 is connected to the turbine wheel in such a way that the axis of rotation 6 and axis of symmetry of the exhaust-gas outlet duct forms an axis of symmetry of the spinner, as shown by way of example in the figure.

Figure 4:
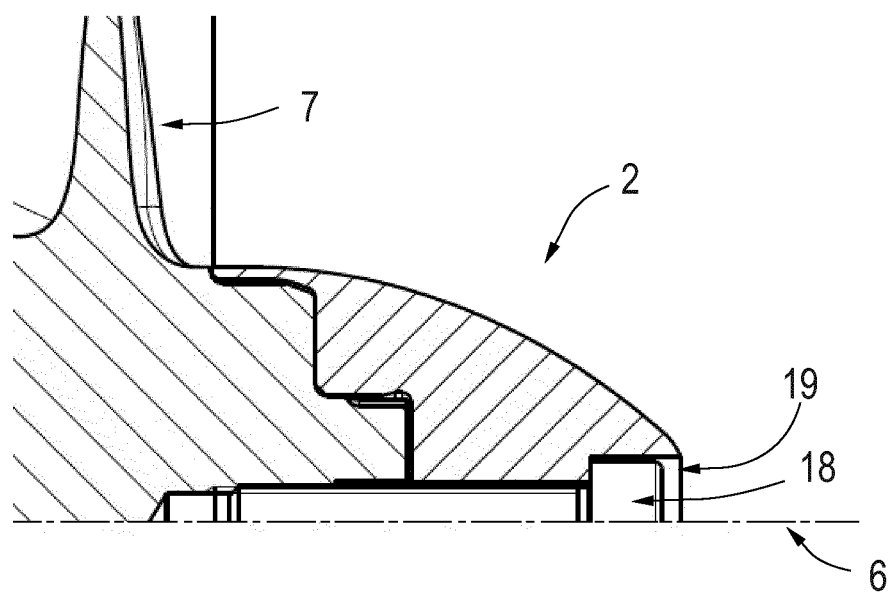
FIG. 4 shows a detailed section through an exhaust gas turbine according to embodiments described herein.

According to one embodiment, which can be combined with other embodiments described herein, the spinner 2 can be embodied as a separate shaped part, as shown by way of example in FIG. 4. For example, the spinner designed as a separate shaped part can be a separate casting. As an alternative, the spinner designed as a separate shaped part can be a deep-drawn sheet-metal element or a turned part.

As illustrated by way of example in FIG. 4, the spinner 2 designed as a separate shaped part can be connected to the turbine wheel 7 by means of a connecting element 18, e.g. a screw. For example, the spinner 2 can have a countersink 19 for the connecting element 18.

According to an alternative embodiment, which can be combined with other embodiments described herein, the spinner designed as a separate shaped part can have an integrated internal thread, and the turbine wheel can have a corresponding external thread, and the shaped part can be screwed by means of the integrated internal thread onto the corresponding external thread of the turbine wheel.

As an alternative, the spinner designed as a separate shaped part can be shrunk onto the turbine wheel. According to another alternative, the spinner designed as a separate shaped part can be connected to the turbine wheel by means of a welded joint. Furthermore, the spinner designed as a separate shaped part can be connected to the turbine wheel by means of staking or by means of knurling.

For a more detailed explanation of the exhaust gas turbine according to the invention, a schematic section through an exhaust-gas outlet duct 15 according to embodiments described herein is illustrated in FIG. 2.

In particular, FIG. 2 shows an exhaust-gas outlet duct 15 which is arranged downstream of the moving blades of the turbine wheel. The exhaust-gas outlet duct 15 is delimited radially on the outside by an axial turbine diffuser 1. Furthermore, the exhaust-gas outlet duct 15 is delimited radially on the inside, at least partially, by a spinner 2.

As illustrated by way of example in FIG. 2, the axial turbine diffuser 1 is formed by a number N>1 of successive conical diffuser segments. FIG. 2 illustrates by way of example three diffuser segments, which are indicated by the dashed lines. In this context, it should be noted that the embodiment with three diffuser segments which is illustrated in FIG. 2 should not be taken as restrictive; instead, it is possible, in principle, to choose any number N of diffuser segments greater than the value 1 (N>1). In particular, the number N of diffuser segments can be N≥2 or N≥3.

Furthermore, axial diffuser opening angles A between the successive diffuser segments are illustrated in FIG. 2. As is apparent from FIG. 2, the axial diffuser opening angle A between the successive diffuser segments should be interpreted to mean the angle which is obtained at the transition between adjacent diffuser segments. An axial diffuser opening angle A between successive diffuser segments typically has a value of A≥1.0°, in particular A≥2.5°. The value for the axial diffuser opening angles A between adjacent diffuser segments can be constant or can have different values. For example, the values of the diffuser opening angle A between successive diffuser segments can increase in the direction of flow 5.

As illustrated by way of example in FIG. 2, the spinner 2 is formed by a number P>1 of successive conical spinner segments. FIG. 2 illustrates by way of example three spinner segments, which are indicated by the dashed lines. In this context, it should be noted that the embodiment with three spinner segments which is illustrated in FIG. 2 should not be taken as restrictive; instead, it is possible, in principle, to choose any number P of spinner segments greater than the value 1 (P>1). In particular, the number P of spinner segments can be P≥2 or P≥3.

Furthermore, axial spinner opening angles B between the successive spinner segments are illustrated in FIG. 2. As is apparent from FIG. 2, the axial spinner opening angle B between the successive spinner segments should be interpreted to mean the angle which is obtained at the transition between adjacent spinner segments.

An axial spinner opening angle B between successive spinner segments typically has a value of B≥1.0°, in particular B≥2.5°. The value for the axial spinner opening angles B between adjacent spinner segments can be constant or can have different values. For example, the values of the spinner opening angle B between successive spinner segments can increase in the direction of flow 5.

The axial diffuser segment length L, the entry height H of the exhaust-gas outlet duct 15, the maximum radius S of the spinner 2 and the axial spinner segment length M are furthermore indicated in FIG. 2. In this context, it should be noted that the axial diffuser segment length L is typically constant. As an alternative, the axial diffuser segment length L can increase in the direction of flow 5 or decrease in the direction of flow 5. The axial spinner segment length M is likewise typically constant. As an alternative, the axial spinner segment length M can increase in the direction of flow 5 or decrease in the direction of flow 5.

A ratio L/H between the axial diffuser segment length L and the entry height H of the exhaust-gas outlet duct 15 typically has a value of L/H>0.01, in particular L/H≥0.05.

A ratio H/S between the entry height H of the exhaust-gas outlet duct and the maximum radius S of the spinner 2 typically has a value of H/S≥1.0, in particular H/S≥1.3.

A ratio M/H between an axial spinner segment length M and the entry height H of the exhaust-gas outlet duct 15 typically has a value of M/H≥0.01, in particular M/H≥0.05.

According to one embodiment, which can be combined with other embodiments described herein, the starting point 16 of the diffuser contour 3 can have an axial offset V in comparison with the starting point 17 of the spinner contour 4 at the inlet to the exhaust-gas outlet duct as illustrated by way of example in FIGS. 2 and 3. The axial offset V of the starting point 16 of the diffuser contour 3 relative to the starting point 17 of the spinner contour 4 can be provided counter to the direction of flow 5, as illustrated by way of example in FIGS. 2 and 3. As an alternative, the axial offset V of the starting point 16 of the diffuser contour 3 relative to the starting point 17 of the spinner contour 4 can be provided in the direction of flow 5 (not illustrated explicitly). In particular, the offset V can be less than or equal to half the entry height of the exhaust-gas outlet duct, i.e. V≤H/2.

Thus, an exhaust gas turbine with an improved diffuser design is advantageously provided which allows improved pressure recovery at the exhaust gas turbine outlet.

In particular, the pressure recovery or the rise in the static pressure downstream of the exhaust gas turbine is improved by a static (nonrotating) axial diffuser and a rotating spinner at the turbine wheel outlet, wherein both the diffuser contour and the spinner contour are designed in such a way that the outlet region, in particular the exhaust-gas outlet duct, increases in size gradually, thereby advantageously making it possible to achieve a gradual increase in the static pressure downstream of the exhaust gas turbine. This has the advantage that the flow velocity at the outlet of the exhaust gas turbine and the kinetic energy losses can be reduced. In particular, the exhaust gas turbine according to the invention has the advantage that expansion losses of the kind which occur, for example, in the exhaust gas turbines known from the prior art due to unsteady and unguided surface changes in the exhaust-gas outlet region can be eliminated, and the exhaust gas flow is normalized. It should furthermore be noted that the reduced outlet flow velocities that can be achieved in the exhaust gas turbine according to the invention can furthermore advantageously lead to a reduction in pressure losses in a downstream piping system.

FIG. 3 shows a schematic section through an exhaust-gas outlet duct 15 of an exhaust gas turbine according to further embodiments described herein.

In particular, FIG. 3 shows that, according to one embodiment, which can be combined with other embodiments described herein, the successive conical diffuser segments provide a radially inward-oriented diffuser contour 3. As is illustrated by way of example in FIG. 3, the radially inward-oriented diffuser contour 3 can be smoothed by a first spline contour 11. The pressure recovery or the rise in the static pressure downstream of the exhaust gas turbine at the turbine wheel outlet can thereby be improved. For example, the first spline contour 11 can be rounded by means of a circular contour with a radius R, wherein the radius R is smaller than or equal to twice the entry height H of the exhaust-gas outlet duct (R≤2H).

Moreover, FIG. 3 shows that, according to one embodiment, which can be combined with other embodiments described herein, the successive conical spinner segments provide a radially outward-oriented spinner contour 4. As is illustrated by way of example in FIG. 3, the radially outward-oriented spinner contour 4 can be smoothed by a second spline contour 12. The pressure recovery or the rise in the static pressure downstream of the exhaust gas turbine at the turbine wheel outlet can thereby be improved. For example, the second spline contour 12 can be rounded by means of a circular contour with a radius U, wherein the radius U is smaller than or equal to the maximum radius S of the spinner (U≤S).

Moreover, FIG. 3 shows that, according to one embodiment, which can be combined with other embodiments described herein, an edge 13 of the last diffuser segment arranged in the direction of flow 5 can be rounded by means of a circular contour with a radius R. This has an advantageous effect on pressure recovery. Typically, the radius R is smaller than or equal to twice the entry height H of the exhaust-gas outlet duct, i.e. R≤2H.

Moreover, FIG. 3 shows that, according to one embodiment, which can be combined with other embodiments described herein, an edge 14 of the last spinner segment arranged in the direction of flow 5 can be rounded by means of a circular contour with a radius U. This has an advantageous effect on pressure recovery. The radius U is typically smaller than or equal to the maximum radius S of the spinner, i.e. U≤S.

As is apparent from the embodiments described herein, an exhaust gas turbine having a diffuser which is improved over the exhaust gas turbines known from the prior art is advantageously made available. In particular, the exhaust gas turbine according to the invention provides an exhaust gas turbine with an improved diffuser design which allows improved pressure recovery at the exhaust gas turbine outlet.

The diffuser of the exhaust gas turbine according to the invention is advantageously implemented in such a way that it has low complexity and size of installation space in comparison with exhaust gas turbine diffusers known from the prior art, this having a positive effect on production costs.

In conclusion, it should be noted that the design of the diffuser and of the spinner described herein can be appropriately adapted in respect of the required dimensioning. In other words, the design of the diffuser and of the spinner described herein is generally applicable and can be applied to small, medium-sized and large sizes of installation space.

The invention claimed is:

1. An exhaust gas turbine comprising:
    a turbine wheel having blades,
    an exhaust-gas outlet duct arranged downstream of the blades of the turbine wheel,
    wherein the exhaust-gas outlet duct is delimited radially on the outside by an axial turbine diffuser and radially on the inside, at least partially, by a spinner,
    wherein the axial turbine diffuser is formed by a number N>1 of successive conical diffuser segments, wherein an axial diffuser opening angle A between successive diffuser segments is A>1.0°, wherein a ratio L/H between an axial diffuser segment length L and an entry height H of the exhaust-gas outlet duct satisfies L/H>0.01, wherein a ratio H/S between the entry height H of the exhaust-gas outlet duct and a maximum radius S of the spinner satisfies H/S>1.0, wherein the spinner is formed by a number P>1 of successive conical spinner segments, wherein an axial spinner opening angle B between successive spinner segments is B≥1.0°, and wherein a ratio M/H between an axial spinner segment length M and the entry height H of the exhaust-gas outlet duct satisfies M/H≥0.01.

2. The exhaust gas turbine of claim 1, wherein the axial turbine diffuser is static, and wherein the spinner is rotatable.

3. The exhaust gas turbine of claim 2, wherein the successive conical diffuser segments provide a radially inward-oriented diffuser contour and wherein the successive conical spinner segments provide a radially outward-oriented spinner contour.

4. The exhaust gas turbine of claim 3, wherein a starting point of the diffuser contour has an axial offset V relative to a starting point of the spinner contour, wherein the axial offset is smaller than or equal to half the entry height H of the exhaust-gas outlet duct (V≤H/2).

5. The exhaust gas turbine of claim 4, wherein the axial offset V of the starting point of the diffuser contour relative to the starting point of the spinner contour is provided counter to the direction of flow.

6. The exhaust gas turbine of claim 1, wherein an edge of the last diffuser segment arranged in the direction of flow is rounded by a circular contour with a radius R, wherein the radius R is smaller than or equal to twice the entry height H of the exhaust-gas outlet duct (R≤2H).

7. The exhaust gas turbine of claim 1, wherein an edge of the last spinner segment arranged in the direction of flow is rounded by a circular contour with a radius U, wherein the radius U is smaller than or equal to the maximum radius S of the spinner (U≤S).

8. The exhaust gas turbine of claim 3, wherein the radially inward-oriented diffuser contour is smoothed by a first spline contour.

9. The exhaust gas turbine of claim 8, wherein the radially outward-oriented spinner contour is smoothed by a second spline contour.

10. The exhaust gas turbine of claim 8, wherein the first spline contour is rounded by a circular contour with a radius R, wherein the radius R is smaller than or equal to twice the entry height H of the exhaust-gas outlet duct (R≤2H).

11. The exhaust gas turbine of claim 9, wherein the second spline contour is rounded by a circular contour with a radius U, wherein the radius U is smaller than or equal to the maximum radius S of the spinner (U≤S).

12. The exhaust gas turbine of claim 1, wherein the successive conical diffuser segments provide a radially inward-oriented diffuser contour, and wherein the successive conical spinner segments provide a radially outward-oriented spinner contour.

13. The exhaust gas turbine of claim 12, wherein a starting point of the diffuser contour has an axial offset V relative to a starting point of the spinner contour, wherein the axial offset is smaller than or equal to half the entry height H of the exhaust-gas outlet duct (V≤H/2).

14. The exhaust gas turbine of claim 2, wherein an edge of the last diffuser segment arranged in the direction of flow is rounded by a circular contour with a radius R, wherein the radius R is smaller than or equal to twice the entry height H of the exhaust-gas outlet duct (R≤2H).

15. The exhaust gas turbine of claim 2, wherein an edge of the last spinner segment arranged in the direction of flow is rounded by a circular contour with a radius U, wherein the radius U is smaller than or equal to the maximum radius S of the spinner (U≤S).

16. The exhaust gas turbine of claim 4, wherein the radially inward-oriented diffuser contour is smoothed by a first spline contour.

17. The exhaust gas turbine of claim 3, wherein the radially outward-oriented spinner contour is smoothed by a second spline contour.

18. The exhaust gas turbine of claim 17, wherein the second spline contour is rounded by a circular contour with a radius U, wherein the radius U is smaller than or equal to the maximum radius S of the spinner (U≤S).

19. The exhaust gas turbine of claim 4, wherein the axial offset V of the starting point of the diffuser contour relative to the starting point of the spinner contour is provided in the direction of flow.

20. An exhaust gas turbocharger comprising:
an exhaust gas turbine comprising:
a turbine wheel having blades, and
an exhaust-gas outlet duct arranged downstream of the blades of the turbine wheel,
wherein the exhaust-gas outlet duct is delimited radially on the outside by an axial turbine diffuser and radially on the inside, at least partially, by a spinner,
wherein the axial turbine diffuser is formed by a number N>1 of successive conical diffuser segments,
wherein an axial diffuser opening angle A between successive diffuser segments is A>1.0°,
wherein a ratio L/H between an axial diffuser segment length L and an entry height H of the exhaust-gas outlet duct satisfies L/H>0.01,
wherein a ratio H/S between the entry height H of the exhaust-gas outlet duct and a maximum radius S of the spinner satisfies H/S>1.0,
wherein the spinner is formed by a number P>1 of successive conical spinner segments,
wherein an axial spinner opening angle B between successive spinner segments is B≥1.0°, and
wherein a ratio M/H between an axial spinner segment length M and the entry height H of the exhaust-gas outlet duct satisfies M/H≥0.01.

* * * * *